(No Model.)
W. A. LOUD.
RATCHET AND PAWL DEVICE.
No. 367,419. Patented Aug. 2, 1887.
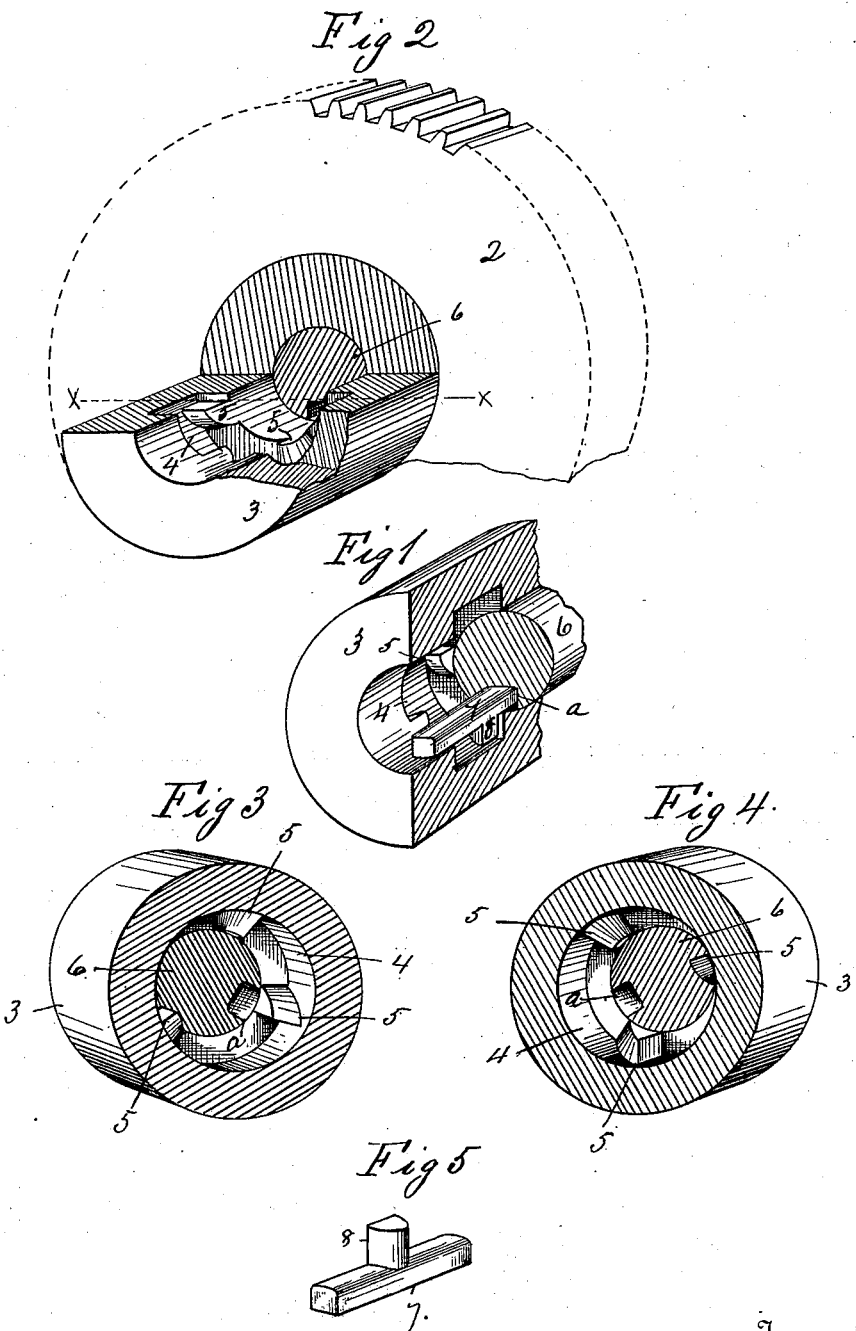

UNITED STATES PATENT OFFICE.

WALDO A. LOUD, OF SPRINGFIELD, MASSACHUSETTS.

RATCHET-AND-PAWL DEVICE.

SPECIFICATION forming part of Letters Patent No. 367,419, dated August 2, 1887.

Application filed March 21, 1887. Serial No. 231,785. (No model.)

*To all whom it may concern:*

Be it known that I, WALDO A. LOUD, a citizen of the United States, residing at Springfield, in the county of Hampden and State of Massachusetts, have invented new and useful Improvements in Ratchet-and-Pawl Devices, of which the following is a specification.

This invention relates to ratchet-and-pawl devices, the object being to provide an improved construction in this class of mechanism, whereby the working parts are better protected from dirt than heretofore, and great simplicity of construction and strength are attained; and the invention consists in the peculiar construction and arrangement of the parts of the device, all as hereinafter fully described, and pointed out in the claim.

In the drawings forming part of this specification, Figure 1 is a perspective view of a longitudinal section of a wheel-hub, a part of a shaft, and a pawl, illustrating ratchet-and-pawl devices constructed according to my invention. Fig. 2 is a perspective view of a portion of a gear-wheel, showing a central shaft therein in transverse section and its hub in longitudinal section, with one corner partly broken away. Figs. 3 and 4 are perspective views of the hub shown in Figs. 1 and 2, divided transversely into two parts on the line $x\ x$, Fig. 2, said Figs. 3 and 4 showing therein sections of a slotted shaft. Fig. 5 is a perspective view of the pawl.

In the drawings, 3 indicates a hub of the gear 2 or of any other wheel to which it may be desirable to attach ratchet-and-pawl connections. The said hub, together with the wheel of which it is a part, is cast on a suitable core, whereby an annular groove, 4, is formed in its inner wall about midway between the ends of the hub, and at the same time two series of ratchet-teeth, 5, are formed on the opposite sides of said annular groove, occupying the positions relative to each other shown in Figs. 1 and 2.

A shaft, 6, is fitted to rotate within the hub 3, or to have the latter rotate around it, in which shaft is formed a longitudinal groove, *a*. The grooved portion of said shaft is adapted to rotate opposite that portion of the hub 3 in which is the aforesaid annular groove 4. Said groove *a* in shaft 6 is cut from the end of the shaft inward, so that said end may be put through the hub 3 when the pawl below described is therein.

A pawl, 7, consisting of a metal bar having an arm, 8, thereon at right angles thereto and about midway between its ends, is adapted to have a free reciprocating movement in the slot *a* in said shaft 6, the said arm 8 projecting from the face of the shaft and entering the groove 4 in the hub 3. One side of the arm 8 on said pawl has its corners curved in order to facilitate its operation when said arm strikes the curved sides of the said teeth 5 on the sides of the annular groove 4. Fig. 1 shows the operative position of the curved side of said arm 8 relative to the curved sides of the teeth 5.

The parts of the ratchet-and-pawl mechanism herein described are assembled together in operative position by placing the pawl 7 within the hub 3, with its arm 8 extending into the groove 4 therein, and then the shaft 6 is passed through said hub, causing the bar portion of the pawl to enter the slot *a* in said shaft. Fig. 1 illustrates a portion of the shaft 6 in operative position in the hub 3, whereby one end of the shaft-hole in the hub is tightly closed, and when said shaft extends quite through the hub both ends of the shaft-passage in the latter are closed, thereby tightly shutting the groove 4 and its teeth 5 and that part of the pawl which operates in connection with the latter within said hub and preventing the entrance of dust and dirt, whereby the parts would be likely to become worn.

The operation of the within-described improvements is exceedingly simple, and is as follows: Referring to Fig. 1, if the shaft 6 be rotated in a direction to carry the pawl 7 toward the teeth shown on the sides of the groove 4 in that figure, the arm 8 of the pawl will strike one tooth after another on the opposite sides of said groove, and be thereby given a longitudinal reciprocating motion and will offer no resistance to the rotation of said shaft; but if the shaft be rotated in the opposite direction the pawl 7, starting from any position within the hub, its arm 8 will engage with one of the teeth 5 and cause the hub and the wheel to which it may be attached to rotate with said shaft.

It will be seen from the above description of the manner of constructing the said ratchetand-pawl devices that the ratchet-teeth 5 and the annular groove 4, in which they are located in the hub 3, are cast in the latter in complete condition to operate with the pawl, and that the expense incurred in making the latter and in grooving the shaft 6 is very slight, and hence the expense involved in the construction of said devices is reduced to a minimum.

I am aware that reciprocating pawls engaging ratchet-teeth within the periphery of a pulley are not broadly new.

What I claim as my invention is—

A ratchet-and-pawl device consisting, essentially, of a hub closed at the end save for a cylindrical shaft-passage, and having an enlarged groove inside provided with teeth extending in opposite directions, in combination with a grooved shaft extending through the shaft-passage in the hub, and a sliding pawl in the groove having an arm extending between the ratchet-teeth in the hub, all substantially as described.

WALDO A. LOUD.

Witnesses:
H. A. CHAPIN,
G. M. CHAMBERLAIN.